United States Patent [19]
Nishimura

[11] Patent Number: 6,142,877
[45] Date of Patent: Nov. 7, 2000

[54] GAME DEVICE

[75] Inventor: Eiji Nishimura, Tokyo, Japan

[73] Assignee: Kabushiki Kaisha Sega Enterprises, Tokyo, Japan

[21] Appl. No.: 08/972,677

[22] Filed: Nov. 18, 1997

[30] Foreign Application Priority Data

Nov. 22, 1996 [JP] Japan .................................. 8-312481

[51] Int. Cl.$^7$ .................................. A63F 9/22; G09B 9/04
[52] U.S. Cl. .................................. 463/46; 434/62; 434/69
[58] Field of Search .................................. 463/46, 36, 37, 463/38, 6; 434/55, 56, 57, 58, 60, 62, 69; 472/59, 60, 130; 273/459–461

[56] References Cited

U.S. PATENT DOCUMENTS

| | | | |
|---|---|---|---|
| 3,479,750 | 11/1969 | Sawanson | 434/62 |
| 3,693,264 | 9/1972 | Waddington et al. | 434/60 |
| 3,940,862 | 3/1976 | Nishimura | 434/60 |
| 4,276,030 | 6/1981 | Radice | 434/62 |
| 4,461,470 | 7/1984 | Astroth et al. | 472/60 |
| 4,464,117 | 8/1984 | Foerst | 434/69 |

*Primary Examiner*—Mark A. Sager
*Attorney, Agent, or Firm*—Finnegan, Henderson, Farabow, Garrett, Dunner, L.L.P.

[57] ABSTRACT

The present invention aims at providing a game device comprising a body moving mechanism for rapidly moving a body in accordance with the game program development. In order to achieve such aim, the game device according to the present invention comprises a handle unit for operating the movements of a virtual vehicle in a game program, and controls the movements of such vehicle in correspondence with the operating signal from the handle unit. For these purposes, a movable body is supported by a fixed body in a freely tilting position. The pulley of the handle unit rolls along a belt when the rotation torque of the AC servomotor is high, and the rudder input from the steering wheel is directly communicated to the movable body.

6 Claims, 6 Drawing Sheets

GAME DEVICE

BACKGROUND OF THE INVENTION

1. Field of the Invention

The present invention relates to a game device structured so that a body mounted by the player is movable, and a virtual moving object maneuvering unit to be used for such game device.

2. Description of the Related Art

A conventionally known game device includes a display unit in front of a body mounted by the player, wherein the programmed movement of cars, airplanes and other vehicles are indicated on the display screen in correspondence with the control input from the operating unit.

Among the game devices of this type, players especially prefer those which provide movement of the body in accordance with the vehicle movements on the screen, and in fact, a large number of such game devices are on the market.

Generally, such game devices are structured to detect the control input from an input unit such as a handle via a sensor, and communicate such input to the body-moving power source to achieve movement of the body.

This type of game device is disclosed in Utility Model Laid-Open Sho 58(1983)-77785 and Utility Model Laid-Open Hei 5(1993)-11991. The first is a monitor game machine in which the player mounts the driver's stand and operates a handle in correspondence with the monitor screen provided in front of the driver's stand, wherein the driver's stand may be tilted forwards, backwards, to the left, and to the right in correspondence with the handle operation. This monitor game machine is able to detect the control input from the handle via a sensor, and tilt the driver's stand by controlling a hydraulic mechanism in correspondence with such control input.

The latter is an image-experiencing simulation seat, which, by providing a gas-driven actuator between a fixed base and a seat, enables free rocking of the seat mounted by the player in accordance with the game program.

However, as conventional game devices move the body through driving mechanisms such as hydraulic devices or gas-driven actuators, sense the control input from handles, etc., and thereafter the controlling base controls the body-moving mechanism in correspondence with the sensed results, it was difficult to move the body rapidly in accordance with the game program development.

On the other hand, there also exist conventional game devices which simulate car driving by directly connecting the handle to an AC servomotor, and realize a steering sense close to actual car driving under the control of an AC servomotor ("Indi 500" by Sega Enterprises, Ltd.). However, they are not structured to move the body in correspondence with the programmed car movements, so that in order to move the body, a separate power source for the movable body such as a hydraulic mechanism or gas-driven actuator becomes necessary, as shown with the two prior arts described above.

SUMMARY OF THE INVENTION

The present invention aims at providing a game device which includes a novel, body-moving mechanism, and particularly a game device which includes a body-moving mechanism which can move the body rapidly corresponding to the handle operation. Another aim of the present invention is to provide a game device which includes a controlling servo mechanism for the operating unit but does not require a separate body-moving mechanism.

In order to achieve the aims above, the game device according to the present invention is a game device for controlling the movements of a virtual vehicle in a game, including an operating mechanism for operating the movements of said virtual vehicle, a body moving mechanism for moving said body, and a communicating mechanism for directly communicating the control input from said operating unit to said body moving mechanism without utilizing a driving mechanism. This body desirably includes a movable body to be mounted by the player and a fixed body for supporting said movable body in a freely tilting manner.

Another preferable mode of the present invention is a game device wherein said virtual vehicle is a car in a game program, said operating mechanism is a handle unit for operating the car movements shown on a display unit, the handle unit is axially supported to be rotatable with regard to said movable body, and said body moving mechanism comprises a pulley connected to said handle unit and a belt contacting the pulley, said movable body structured to reciprocate in its tilting direction in accordance with the rolling of the pulley along the belt.

In this case, it is desirable with this game device that said belt contacts a rotating body for controlling the rotation torque, and this game device further includes a rotation torque controlling means for the rotating body.

The game device according to the present invention further comprises a torque controlling means for performing control so that said rotation torque controlling means prevents the rotation of said rotating body when said rotating body is caused to rotate via said belt in correspondence with the rotation of said handle.

It is desirable that said rotating body is a servomotor, and said rotation torque controlling means is a means for controlling the rotation torque of this servomotor. Furthermore, said rotation torque controlling means performs control so that the standstill torque of said rotating body increases with the increase in speed of said car in a program. It is also desirable that a pulley connected to said handle unit rolls along said belt in correspondence with the increase in said rotation torque.

The virtual moving object maneuvering unit according to the present invention is a virtual moving object maneuvering unit for maneuvering the movements of a virtual moving object moving inside a virtual space, including a movable body simulating the maneuvering seat of said virtual moving object, a fixed body supporting said movable body in a freely rocking state, a handle provided in said movable body for controlling at least one portion of the movements of said virtual moving object, and a communicating and rocking means for mechanically communicating the movements of said handle to said movable body and to rock the movable body.

As one preferable mode of the present invention, it is desirable that this virtual moving object maneuvering unit further includes a communicated input controlling means for controlling the communicated input of the movements of said handle to be communicated to said movable body. It is also desirable that this communicated input controlling means controls said communicated input in correspondence with the movement speed of said virtual moving object. It is also desirable that the communicating and rocking means causes said movable body to rock in the direction opposite to the movement of said handle. It is further desirable that the handle includes a rotation central shaft and is provided rotatably around this rotation central shaft, and said movable body is supported by said fixed body in a freely rocking state around a swinging central axis substantially parallel to said rotation center.

DESCRIPTION OF THE PREFERRED EMBODIMENTS

Figure 1:
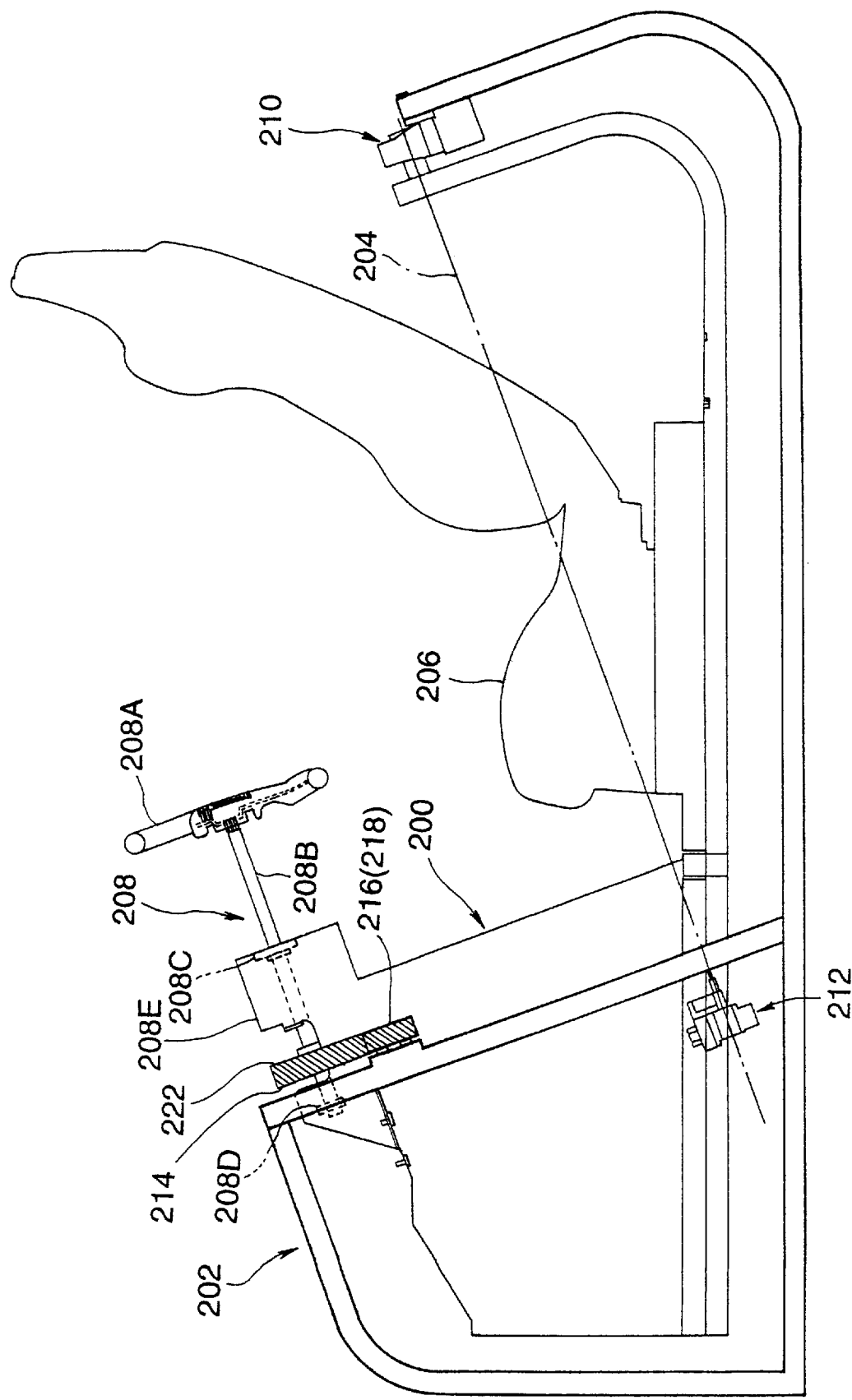
FIG. 1 is a side view of the body of the game device according to one embodiment of the present invention.

Now, the embodiments of the present invention will be explained with reference to the drawings. FIG. 1 is a side view showing one embodiment of the game device relating to the present invention. This game device includes a body which the player can mount, and in front thereof, a large panel has been provided for indicating the game screen which results from the driving simulation of the car.

When the player operates the accelerator, gear, brake and handle provided inside this body, he can control the movements of the car in correspondence therewith as a virtual moving object indicated on this screen. The car movements are controlled corresponding to the input signals from an input unit such as a handle, via a game control substrate to be described in further detail below.

This body is equivalent to the virtual moving object maneuvering unit according to the present invention, and is largely made of a fixed body 202 fixed to the ground, and a movable body 200 which tilts around the axis 204 with regard to this fixed body. Furthermore, the use of the expressions "rotate" (in one direction), "rotate" (in both directions) or "rock" instead of "tilt" shall be permitted.

Figure 2:
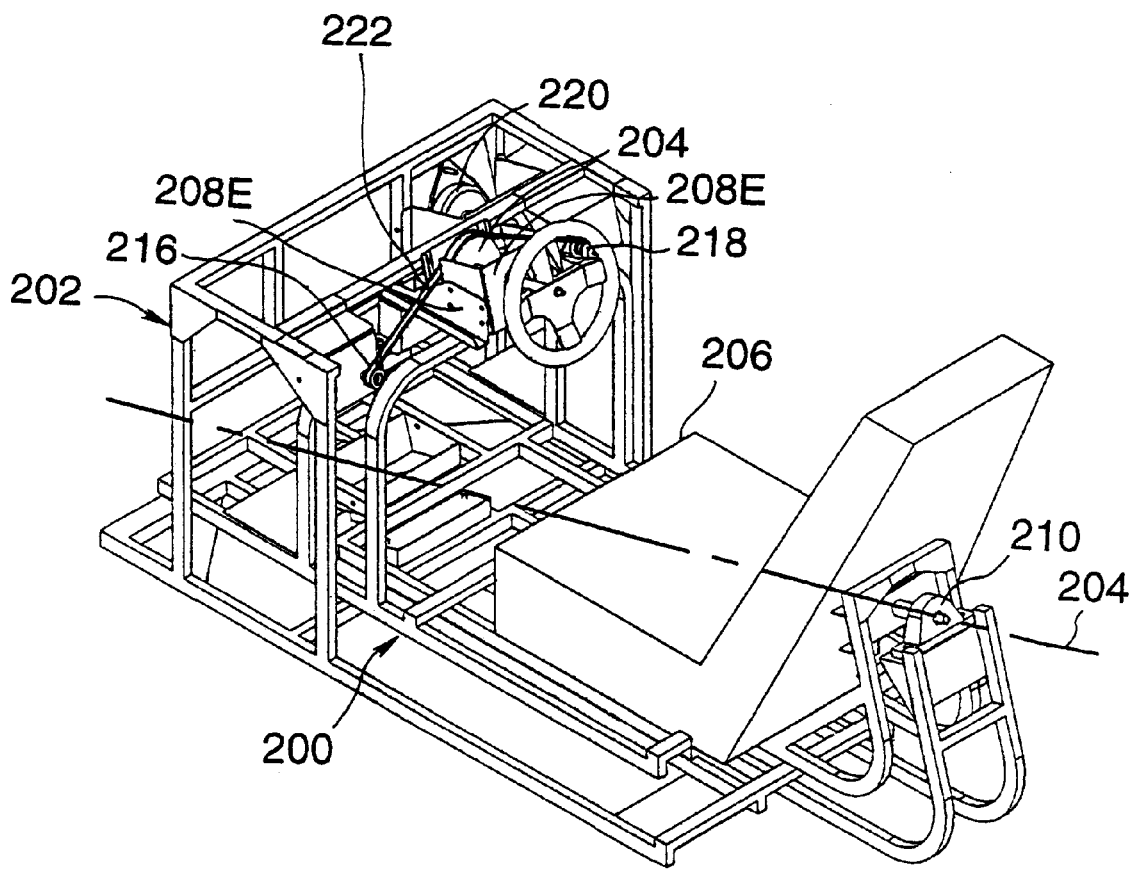
FIG. 2 is a perspective view of this body.
Figure 3:
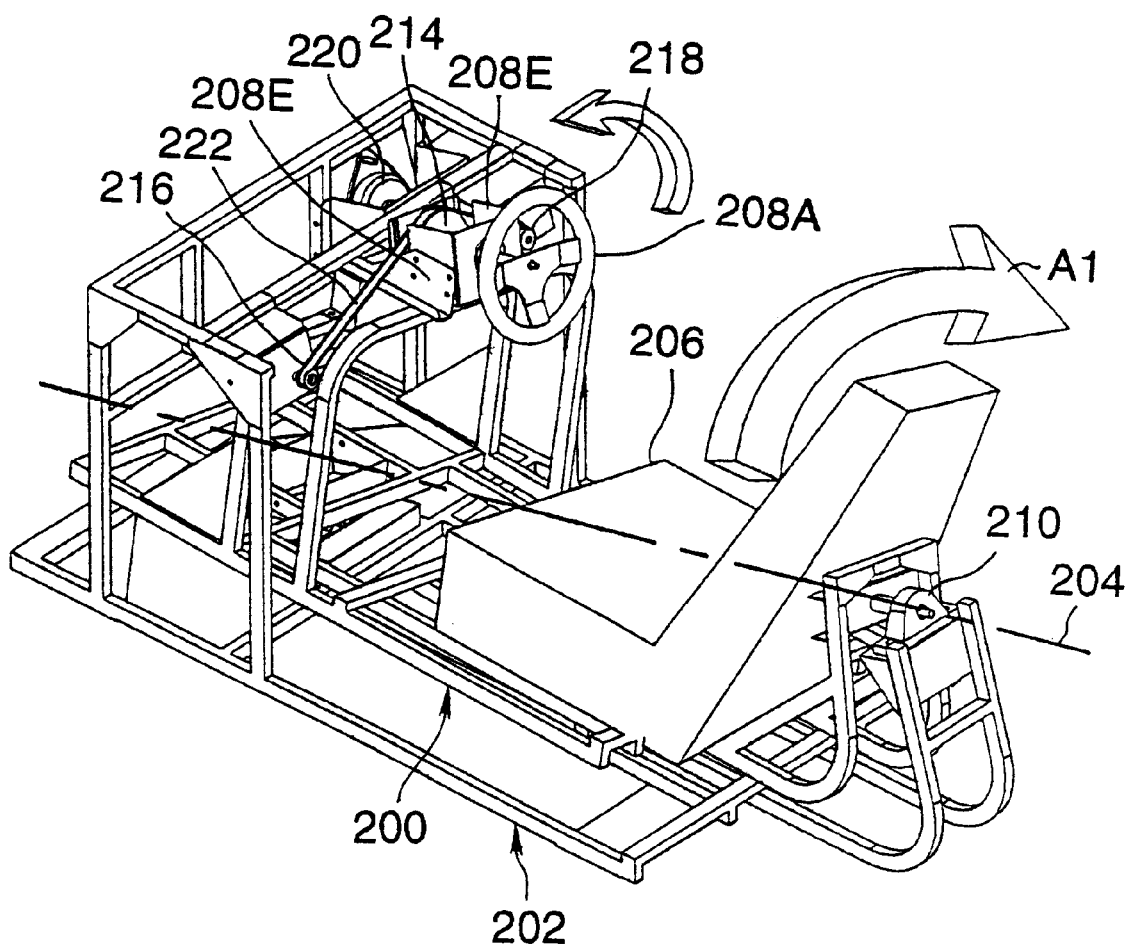
FIG. 3 is a perspective view of this body in a tilting state.

The modes of the fixed body and the movable body may be understood more accurately by referring to FIG. 2 and FIG. 3, which are perspective views of FIG. 1. At approximately the bottom of the movable body, a seat 206 exists where the player can sit. In front of the movable body, a handle unit (steering unit) 208 has been further provided. 10

The movable body 200 is supported against the fixed body 202 to be rotatable around said axis 204 by the bearing 210 existing at the back center of the seat 206, and the bearing 212 existing in the front center of the seat at a low position. In this way, the axis 204 as shown in FIG. 1 through FIG. 3 become the central axis around which the movable body tilts. This movable body may tilt clockwise as shown by the arrow A1 in FIG. 3, or in the opposite, counterclockwise direction.

The handle unit above includes a steering wheel 208A, a pair of bearings 208C and 208D which support the front and back ends of the steering shaft 208B, and a frame 208E for fixing these bearings.

This frame body 208E is fixed to the frame of the movable body at a position near the front of the movable body 200. The movable body and the fixed body are both mainly structured as frames. At the tip opposite the steering wheel of the steering shaft 208B, a volume for detecting the rotation of the steering wheel 208A has been provided to reflect the rudder angle and speed in the movements of the game program vehicle. The same applies to the accelerator or brake operation and the current gear information described above.

The central axis 204 around which the movable body tilts is designed to be parallel to the extension of the handle shaft 208B above. Thereby, it is possible to rock the movable body by smoothly communicating the rotating movement of the steering wheel thereto, and also tilt the movable body in a direction which is not unnatural to the player sitting on the seat 206, without using a complex mechanism such as a universal joint. Naturally, by connecting the steering shaft to the pulley 214 which has a horizontal rotation axis via a universal joint, it is possible to set the tilting axis of the movable body parallel to the ground.

Then, by tilting the movable body in correspondence with the operation of the steering wheel, the incurring of rolling and of centrifugal force in actual car movements, and increases, decreases, etc., therein can be virtually communicated to the player.

(Body-Moving Mechanism)

The movable mechanism for tilting the movable body above is structured as follows. As shown in FIG. 1 through FIG. 3, a first pulley 214 with a relatively large diameter is fixed to the tip side of said steering shaft 208B. On the other hand, a pair of small pulleys 216 and 218 are provided at the two front ends of the fixed body 200 to face the seat 206.

Figure 4A:
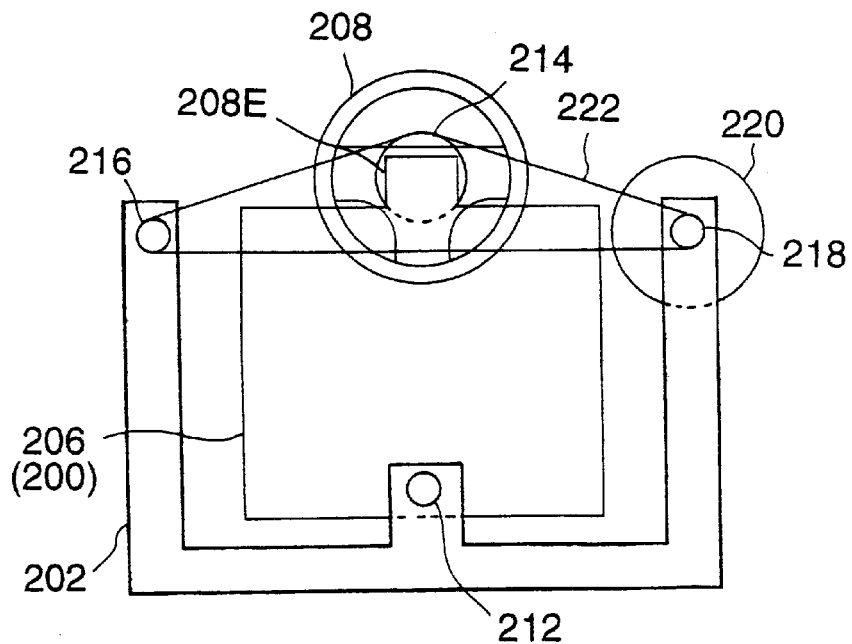
FIG. 4(A) is a simplified model view of the tilting mechanism for the body.

FIG. 4 is a model view showing the arrangement of these pulleys. When describing this in further detail by referring to FIG. 4, an AC servomotor 220 is directly connected to the pulley 218 which is one of the pair of small pulleys to the right seen from the seat (cf. FIG. 2 and FIG. 3).

On the other hand, the left pulley 216 functions as an idle pulley ("idle pulley"). An encircling belt 222 (preferably a timing belt) is placed over these pulleys with a predetermined tension to be engaged with such pulleys.

Pulleys 216 and 218 are fixed to the fixed body 202 to face the side of the seat 206. Accordingly, the belt 222 is provided on the fixed body. The movable body 200 is supported by the above-described bearings 210 and 212. The above-mentioned pulley 214 engages with the belt 222 to be indirectly supported by the fixed body 202. By moving and rolling the pulley 214 at the tip of the steering shaft along the belt as described below, it becomes possible to tilt the movable body to the left and to the right at the side of its handle unit 208 around the above-mentioned central axis 204.

(AC Servomotor)

By utilizing a first pulley 214 on the tip of the steering shaft, a second pulley 218 directly connected to the shaft of the AC servomotor, a loop-shaped belt 222 which engages with these pulleys, and an AC servomotor 220, a controlling system can be realized in which the servomotor endeavors to stand still at its position due to its standstill torque when the servomotor tries to rotate corresponding to the steering.

When the first pulley 214 rotates due to the steering and the belt 222 rotates, the servomotor 220 also tries to rotate in the same direction due to such controlling operation, etc., but at this time, the standstill force of the servomotor, namely the rotation torque in the direction opposite to that in which the steering wheel is turned, is greater.

At this time, the belt 222 which rotates in the rotation direction of the first pulley 214 becomes difficult to rotate, and when the player tries to turn the steering wheel further in the same direction, the first pulley will roll along the belt 222 in the direction opposite to the steering direction. This can be understood clearly from FIG. 3 or FIG. 4(B).

Figure 4B:
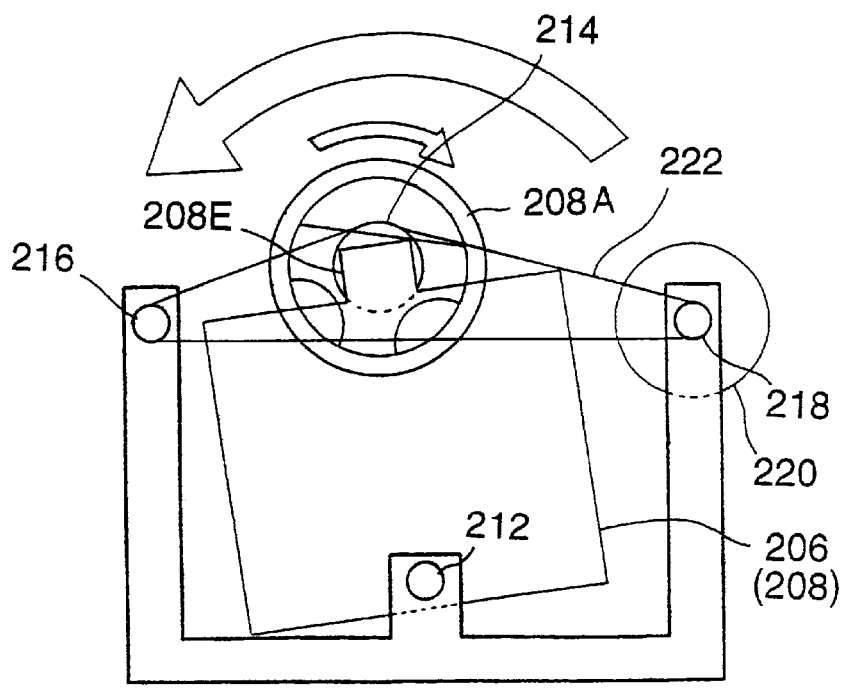
FIG. 4(B) is a simplified model view of the body in a tilting state.

At this time, since the frame body 208E with fixed bearings moves together with the first pulley 214 and the bearings supporting the steering shaft, this frame as well as the movable body 200 tilt in the direction opposite to the steering direction, as shown in FIG. 3 and FIG. 4(B).

As the movable body tilts due to the steering, the game device may provide the player with senses similar to the rolling or the incurring of centrifugal force in actual cars in a virtual and simulated manner. The detailed controlling movement will be described below.

The controlling characteristics of the rotation torque of the AC servomotor are realized by the controlling driver of the AC servomotor based on the viscosity and spring force required in correspondence with the game program from the side of the game substrate. The controlling driver will be explained below.

The viscosity is a factor which simulates the resistance during the rotation of the steering wheel. The higher the rudder speed, the lighter the steering wheel, and the lower the rudder speed, the heavier the steering wheel so the greater the viscosity, the greater the gap between these two. Whether the handling of the steering wheel feels light or heavy will be adjusted by controlling the standstill torque of the AC servomotor as described above.

In the controlling system above, the force of the servomotor to restore to the original position when rotating from the standstill position is defined by its comparison to a spring, and the higher the virtual movement speed of a car in the program (hereinafter referred to as the "virtual vehicle"), the greater the spring factor (spring force). Therefore, the greater the spring force, the restorative force of the servomotor (standstill torque) is controlled to be greater.

The game substrate calculates said spring force and viscosity, but mainly calculates the spring force corresponding to the speed of the virtual vehicle in steps or continuously, and provides the AC servomotor controlling driver therewith. This controlling driver determines the rotation torque of the AC servomotor based on the supplied spring force and viscosity, and outputs order signals to cause the AC servomotor to realize such determined torque.

Furthermore, in the present embodiment, in order to keep the feel of the steering more constant, the viscosity is not changed greatly. However, this is without prejudice to any necessary changes in the viscosity.

(AC Servomotor Controlling Driver)

Figure 5:
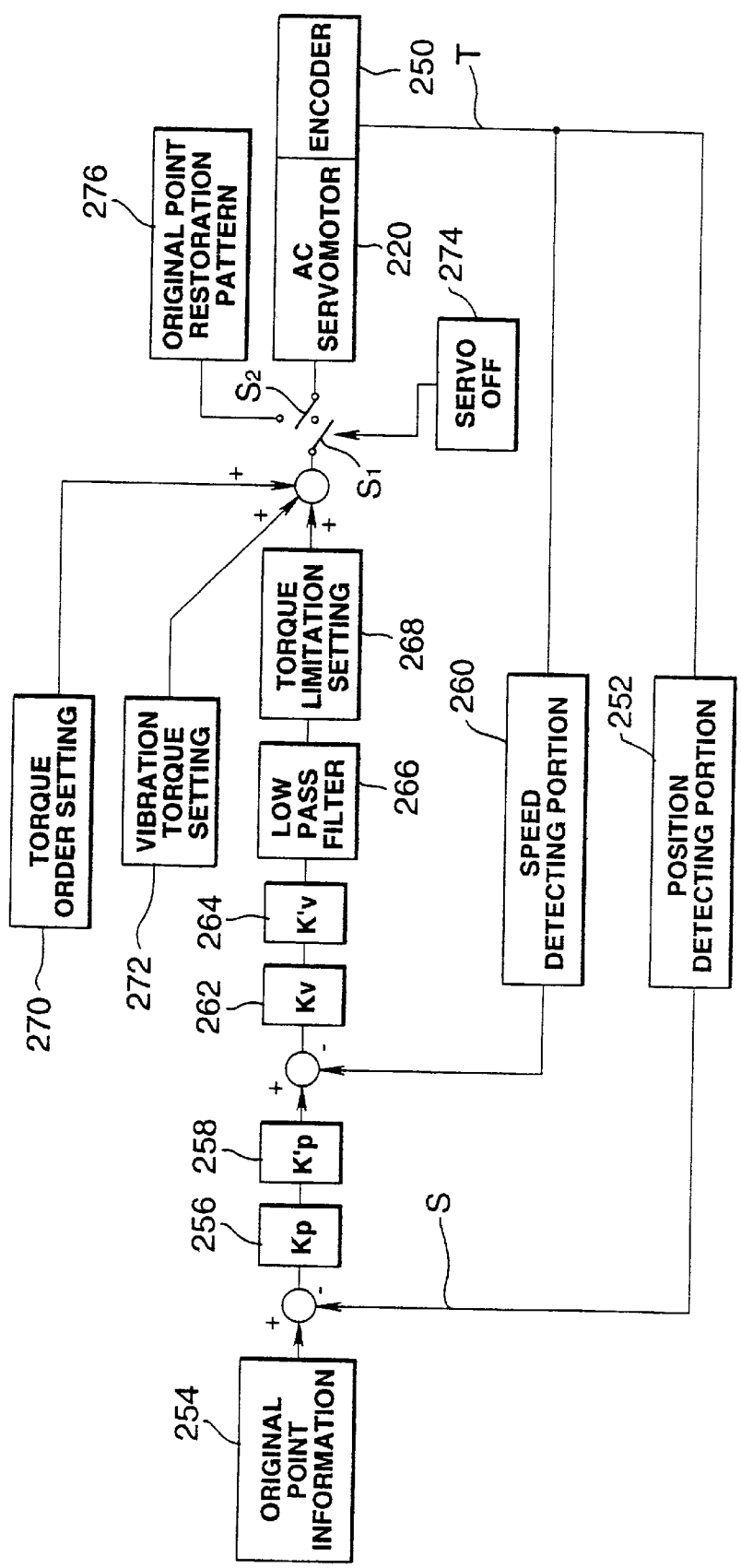
FIG. 5 is a block view showing the functions of the AC control driver.

Next, the controlling driver of the AC servomotor will be explained. FIG. 5 is a structural view of the controlling block of this controlling driver. This controlling block realizes a controlling system (servo mechanism) which functions to cause the AC servomotor 220 to stand still at its position (angle of rotation) as described above. Reference numeral data is output from an encoder 250 corresponding to the rotation of the AC servomotor 220, and the position of the AC servomotor is detected through a position detecting unit 252.

The original point position data 252 of the servomotor is added to or subtracted from this position data S, thereby determining the rotation position of the servomotor 220 from the original point, and subsequently, the spring force Kp256 and the gain correction value K'p258 which are set for the determined position are multiplied with thereon.

On the other hand, the speed detecting unit 260 detects the rotation speed of the servomotor from the signal T output from the encoder, and feeds back such detected speed to the subtracter connected after the gain correction value K'p multiplier 258. In other words, the higher the rotation speed of the servomotor (the greater the rudder speed of the steering wheel), the greater the reduction of the calculated value, and after the viscosity Kv 262 and the gain correction value K'v 264 are multiplied, the initial torque order is formed after passing through a low pass filter 266.

The torque limitation setting 268 is conducted for this initial torque order, and any initial torque designation which exceeds the range of the set value is corrected down to the torque limitation value. Then, if there is any set value from the side of the game substrate, the final torque order will be obtained by adding a torque order setting 270 for adding a torque relating to factors other than the spring force and the viscosity, with a vibration torque setting 272 which is generated when the virtual car drives along a bumpy road.

Moreover, the servo OFF 274 is a controlling block for controlling the switch S1 provided between the adder connected after the torque limiting setting 268 which intercepts torque orders to the servomotor, and the AC servomotor 220, but in the present embodiment, the switch S1 is almost constantly in an ON state. The original point restoration pattern 276 is a controlling block for forcing the rotation angle axis of the servomotor to the original point and thereby setting the movable body 200 to its basic position. When the electric source is in an ON state and the switch S2 closes contact, the servomotor is connected to the original state restoration pattern. If the game program is being performed, this contact is closed at the side of the AC servo motor.

Furthermore, as this controlling system is controlled so as to increase the increasing rate of the rotation torque in accordance with an increase in the spring force and the viscosity, the movable body is controlled so as to tilt even more with a smaller rudder angle of the steering wheel in accordance with a greater movement speed of the virtual vehicle.

The torque setting order simulates the situation, etc. when a retraction force is applied to the steering wheel, for example, when the virtual vehicle hits a wall, and this order applies a rotation torque of a desired value to the AC servomotor in the direction of the virtual retraction force and communicates this torque to the pulley 214 of the steering shaft via the belt 222.

The above servomotor and controlling driver form the "communicated input controlling means" in the claims, and said belt 222 and pulley 214 form the "communicating and rocking means."

[Game Controlling Substrate]

Figure 6:
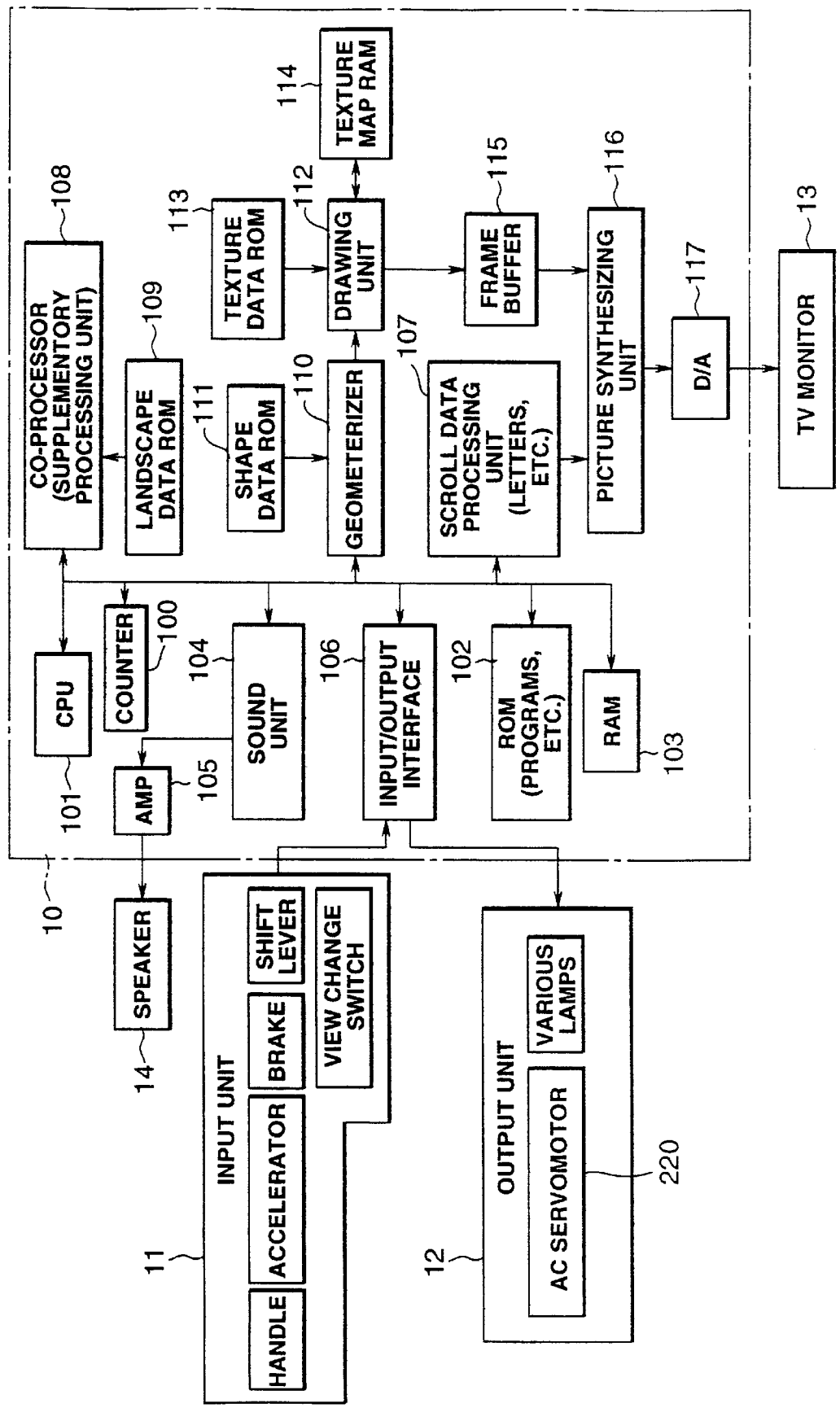
FIG. 6 is a block view of the game control substrate.

FIG. 6 is a block view which mainly describes the game controlling substrate. An input unit 11, an output unit 12, a TV monitor 13 and a speaker 14 are connected to this game controlling substrate 10.

The input unit 11 includes in addition to the handle unit above, an accelerator, brake, shift lever and view change switch, etc., and the output unit 13 includes an AC servomotor and various lamps, etc. The AC servomotor is connected to the game controlling substrate via the above-mentioned AC servo controlling driver.

The TV monitor 13 indicates a driving game picture, and a projector may be substituted for this TV monitor. The view change switch is a switch which changes the viewpoint. Through the operation of this switch, the player is provided with a viewpoint from the driver's seat (seat) or when viewing the car from a diagonal, back angle.

The game controlling substrate 10 includes in addition to a counter 100 and a CPU (central processing unit) 101, a ROM 102, a RAM 103, a sound unit 104, an input/output interface 106, a scroll data calculating unit 107, a co-processor (supplementary processing unit) 108, a landscape data ROM 109, a geometrizer 110, a shape data ROM 111, a drawing unit 112, a texture data ROM 113, a texture map RAM 114, a frame buffer 115, a picture synthesizing unit 116, and a D/A converter 117.

The CPU 101 is connected via bus lines to a counter 100 which conducts the countdown from an initial value, a ROM 102 which stores predetermined programs, etc., a RAM 103 which stores data, a sound unit 104, an input/output interface 106, a scroll data calculating unit 107, a co-processor 108, and a geometrizer 110. As the RAM 103 is employed to function as a buffer, it conducts the writing of various commands into the geometrizer (indication of objects, etc.), writing of matrices during the conversion matrix calculation, and other functions.

The input/output interface 106 is connected to the input unit 11 and the output unit 12 described above, and thereby, the operation signal from the handle of the input unit 11, for example, is included in the CPU 101 as digital input, so that the signals generated by the CPU 101 or other units may be output to the output unit 12. The sound unit 104 is connected to a speaker 14 via a power amplifier 105, and after the sound signal generated by the sound unit 104 is electrically amplified, it is given to the speaker 14.

The CPU 101 according to the present embodiment reads operation data from the input unit 11 and landscape data from the landscape data ROM 109, both based on the program installed in the ROM 102, or shape data from the shape data ROM 111 (three-dimensional data such as "your car, enemy cars, and other objects" and "routes, landscape, sky, audience, constructions, and other types of background"), and conducts at least the car movement calculation (simulation), such as the judgment of hitting (collision) between the landscape and the car, and the judgment of collision between cars.

The car movement calculation simulates the movement of cars inside a virtual space in accordance with the operation signals given by players via the input unit 11, so that after the coordinate values inside the three-dimensional space are determined, the conversion matrix for converting these coordinate values into a view coordinate system is designated together with the shape data (polygon data) into the geometrizer 110.

The co-processor 108 is connected with the landscape data ROM 109, and according therewith, predetermined landscape data is delivered to the co-processor 108 (and the CPU 101).

The co-processor 108 mainly performs the judgment of whether the car has hit the landscape, and during this judgment and the car movement calculation, performs mainly the calculation of the floating decimals. As a result, the co-processor 108 performs the judgment of whether the car has hit the landscape, and the judgment results are given to the CPU 101, so that the CPU's calculation load is reduced, and the judgment of the hit is performed even more rapidly.

The geometrizer 110 is connected to the landscape data ROM 111 and the drawing unit 112. As described above, the landscape data ROM 111 has stored thereon shape data formed of a plurality of polygons (three-dimensional data such as cars, landscape and background, which are formed of the vertices of the polygons) in advance, and these shape data are delivered to the geometrizer 110. The geometrizer 110 perspectively converts the shape data designated by the conversion matrix sent from the CPU 101, and data converted into the view coordinate system from the coordinate system of the three-dimensional virtual space is obtained. The drawing unit 112 pastes the texture onto the converted shape data of the view coordinate system, and outputs such data to the frame buffer 115.

In order to perform this texture pasting, the drawing unit 112 is connected to the texture data ROM 113 and the texture map RAM 114, as well as to frame buffer 115. Polygon data means a data group of relative or absolute coordinates of each of the vertices of polygons (mainly triangles or quadrangles) formed by an aggregate of a plurality of vertices. The above landscape data ROM 109 has stored thereon relatively roughly set polygon data sufficient for performing the judgment of hitting between the car and the landscape.

In answer thereto, the shape data ROM 111 has stored thereon more detailed set polygon data which relate to the shapes forming the screen, such as cars and the background.

The scroll data calculating unit 107 calculates the scroll screen data such as letters (stored in the ROM 102), and this calculating unit 107 and the above frame buffer 115 reach the TV monitor 13 via the picture synthesizing unit 116 and the D/A converter 117. Thereby, the polygon screens (simulation results) such as the cars and landscape (background) which have been stored temporarily in the frame buffer 115, and the scroll screen of letter information such as the speed value and lapsed time are synthesized in accordance with the designated priority to generate the final frame picture data. This picture data is sent to the TV monitor 13 after their conversion into analog signals via the D/A converter 117, and the driving game picture is indicated in real time.

This game controlling substrate determines the spring force and viscosity stored as ROM data in advance which correspond to the calculated speed of the virtual car, and these are set with the controlling driver of the AC servomotor. The calculating unit of this controlling driver successively performs the controlling movement above, and outputs the final torque order to the AC servomotor. The AC servomotor is controlled based on this final torque order.

Furthermore, the UDAF42BVSG made by Matsushita Electric Motors Kyushyu Co., Inc. (AC brushless motor) may be utilized as the AC servomotor. As the controlling driver described below, the ADKF41B1SG and the ADKF42B1SG of the same company may be used.

(Overall Movement)

Next, the overall movement of the game device will be explained.

1) When the virtual car drives at a low to medium speed

If the virtual car drives at a low or medium speed, the spring force above is set small, and the final rotation torque of the AC servomotor obtained according to the functional block view in FIG. 5 is controlled to be within a small range.

In this case, if the steering wheel 208 is turned to rotate the first pulley 214, the second pulley 218 of the AC servomotor also rotates relatively simply, and the belt 222 rotates simultaneously with the rotation of the first pulley.

Accordingly, an image of the curving virtual car is shown on the screen with little tilting of the movable body.

2) When the virtual car drives at a medium to high speed

On the other hand, when the speed of the virtual car becomes greater, the rotation torque of the AC servomotor becomes greater in the direction in which the AC servomotor tries to restore to the original point, as described above, i.e. the direction opposite the steering direction of the handle, and the belt resists the rotation of the first pulley. When the player tries to rotate the steering wheel further in the same rotation direction, the first pulley rolls along the belt and the movable body 200 tilts in the direction opposite the rotation direction of the handle around the tilting axis 204, as shown in FIG. 3 and FIG. 4(B). At the same time, an image of the virtual car on the display screen driving along a curved course is shown on the display unit.

When maintaining the steering state of the steering wheel as shown in FIG. 3 and FIG. 4(B), the torque trying to turn the steering wheel and the rotation torque stated above applied to the AC servomotor is in a balanced state, and the tilted state of the movable body is maintained as is.

Next, when trying to steer back in the opposite direction to make the virtual car drive straight forward, the first pulley, the second pulley and the belt rotate simultaneously due to the rotation torque of the AC servomotor, and the steering wheel together with the movable body are restored to the central position.

Furthermore, other virtual car movements are drifting, spin, etc., but by controlling the rotation torque of the AC servomotor at such times to a desired value, it is possible to tilt this movable body and at the same time communicate this rotation torque via the belt 222 to the pulley 214 of the steering shaft, and thereby experience a sense of steering the wheel which is close to the actual drifting and spinning, etc.

At approximately the center of the lower portion of the movable body, a spring mechanism is provided thereto for biasing the movable body to the central position, and under the influence of the tension of this spring mechanism, the movable body is structured so it is easily restored to this central position. This spring mechanism biases the body so it is restored to its central position within a range which does not hinder the tilting movement of the movable body according to the steering.

According to the embodiment described above, the handle steering input is communicated via the belt 222 directly to the body moving mechanism, thereby rapidly moving the body in accordance with the steering of the handle unit.

Furthermore, by including a servomotor for nearing the sense of steering the handle unit to the steering of actual cars, controlling the rotation torque thereof is sufficient for achieving the movement of tilting the movable body by the steering.

It is also possible to change the tilting (rolling) of the movable body in correspondence with the speed of the virtual car, so that it is possible to simulate an even more real feeling of driving vehicles. The power required for the player to steer the wheel is utilized as the power for tilting the movable body, so that it is possible to rapidly move the movable body during steering. Furthermore, as the weight of the movable body may be utilized for the sense of heaviness of the handle, the player can experience a proper sense of heaviness as if he were steering the handle of a real car.

The present embodiment has been explained as a game device for simulating the driving of a car, but it may be without limitation a game device which simulates the movements of ships or airplanes, etc. Preferably, the belt and pulley are timing belts with teeth and pulleys with teeth, but under the appliance of a desired tension, the pulley may slide along a V-belt. Furthermore, sliding crutches and DC servomotors may be substituted for the AC servomotor. It is also possible to use a pinion gear and a rack gear instead of the pulley and belt.

What is claimed is:

1. A game device for controlling the movements of a virtual vehicle in a game program, comprising an operating mechanism for operating the movements of said virtual vehicle, a body moving mechanism for moving a body, wherein said body further comprises a movable body to be mounted by the player and a fixed body for supporting said movable body in a freely tilting manner, and a communicating mechanism for directly communicating the control input from said operating unit to said body moving mechanism without utilizing a driving mechanism, wherein said operating mechanism is a handle unit for operating the virtual vehicle movements shown on a display unit, the handle unit is axially supported to be rotatable with regard to said movable body, and said body moving mechanism comprises a pulley connected to said handle unit and a belt contacting the pulley, said movable body structured to reciprocate in its tilting direction in accordance with the rolling of the pulley along the belt.

2. A game device according to claim 1, wherein said belt contacts a rotating body for controlling the rotation torque, and further comprising a rotation torque controlling means for the rotating body.

3. A game device according to claim 2, wherein said rotation torque controlling means performs control so that the standstill torque of said rotating body increases with the increase in speed of said car in a program.

4. A game device according to claim 2, wherein a pulley connected to said handle unit rolls along said belt in correspondence with the increase in said rotation torque.

5. A game device according to claim 2, further comprising a torque controlling means for performing control so that said rotation torque controlling means prevents the rotation of said rotating body when said rotating body is caused to rotate via said belt in correspondence with the rotation of said handle.

6. A game device according to claim 5, wherein said rotating body is a servomotor, and said rotation torque controlling means is means for controlling the rotation torque of this servomotor.

* * * * *